United States Patent [19]

Reilly

[11] Patent Number: 5,787,237
[45] Date of Patent: Jul. 28, 1998

[54] UNIFORM INTERFACE FOR CONDUCTING COMMUNICATIONS IN A HETEROGENEOUS COMPUTING NETWORK

[75] Inventor: Paul E. Reilly, San Jose, Calif.

[73] Assignee: Apple Computer, Inc., Cupertino, Calif.

[21] Appl. No.: 470,962

[22] Filed: Jun. 6, 1995

[51] Int. Cl.⁶ ............................................. G06F 13/00
[52] U.S. Cl. ................... 395/112; 395/114; 395/831; 395/859; 395/885
[58] Field of Search ................... 395/114, 112, 395/285, 284, 200.02, 200.01, 200.2, 680, 200.6, 200.8, 200.79, 200.56, 200.59, 828, 831, 856, 859, 882, 885, 835–839

[56] References Cited

U.S. PATENT DOCUMENTS

| | | | |
|---|---|---|---|
| 5,075,874 | 12/1991 | Steeves et al. | 395/112 |
| 5,303,336 | 4/1994 | Kageyama et al. | 395/114 |
| 5,323,393 | 6/1994 | Barrett et al. | 340/825.22 |
| 5,371,837 | 12/1994 | Kimber et al. | 395/114 |
| 5,517,636 | 5/1996 | Dehart et al. | 395/284 |
| 5,636,333 | 6/1997 | Davidson, Jr. et al. | 395/114 |

FOREIGN PATENT DOCUMENTS

| | | |
|---|---|---|
| 0598511 | 5/1995 | European Pat. Off. |
| 0653700 | 5/1995 | European Pat. Off. |

OTHER PUBLICATIONS

D.E. Comer et al., "Client-Server Programming and Applications," *Internetworking with TCP/IP*, vol. III, pp. 49–55, 1993.

*Primary Examiner*—Scott Rogers
*Attorney, Agent, or Firm*—Burns, Doane, Swecker & Mathis, L.L.P.

[57] ABSTRACT

A network printing system for enhancing two-way communication between host computers and printers connected to a network. More particularly, the network printing system provides an imaging device protocol (DP) which enables various network service protocol/ports for host computers to communicate with the printer by "seamless plug and play" connectivity. IDP operates independently of the network layers below and only requires that the transport protocol/port be bidirectional. IDP allows all of the incoming print job information to be placed in the print queue regardless of the protocol for a wide variety of heterogenous network protocols. As a result, the network printing system enables print jobs from host computers connected to the network by a wide variety of heterogenous network protocols to be fairly arbitrated at the printer.

10 Claims, 5 Drawing Sheets

FIG. 5

UNIFORM INTERFACE FOR CONDUCTING COMMUNICATIONS IN A HETEROGENEOUS COMPUTING NETWORK

FIELD OF THE INVENTION

The present invention is directed to a network printing system that allows the printer to achieve an enhanced two-way communication between the computer and the network printer for a plurality of heterogeneous network protocols. More particularly, the present invention provides an imaging device protocol (IDP) and an IDP emulator which enable various network service protocol/ports, both IDP and non-IDP ports, to communicate with the printer by "seamless plug and play" connectivity.

BACKGROUND OF THE INVENTION

As the size of networked systems increases from a few connected computers located near each other to several thousand machines of various types and sizes scattered at great distances from each other, the demands on the network printers also increase. One of the most challenging demands in the implementation of network printers is connectivity. Typically, the network printer is a stand-alone peripheral device which is desired to perform in an increasing number of network and non-network communication environments. In network environments, the printer is desired to provide "seamless plug and play" connectivity for the continuous expansion of network service protocol/ports. For example, known network service protocol/ports that are desired to communicate with network printers are: printer access protocol (PAP)/LocalTalk (LT); PAP/EtherTalk (ET); transmission control protocol/internet protocol (TCP/IP); TCP/IP port 9100; LPR/TCP/IP; Novell remote printer or print server modes; bidirectional or unidirectional Centronics; AppleTalk Data Stream Protocol (ADSP)/EtherTalk; ADSP/LocalTalk; and Novell sequence packet exchange (SPX). These are just a few examples of the constantly increasing number of network protocol/ports that desire "plug and play" connectivity to the network printer.

A printer is a peripheral device that can be shared on a network connected to a print server. Also, a printer can directly connect to the network by including a network interface card or the network interface into the printer which allows the printer to run its own print server software and function as a regular node. In a typical Windows environment, the network printer is a one-way printer. In a one-way printer, the only communication path is from the host computer to the printer. As a result, the data is sent from the host computer to the printer without any ability for the printer to notify the host computer of the job status such as whether the print job has been successfully completed.

The use of a two-way printer has been developed for Macintosh systems (Apple Computer, Cupertino, Calif). In the AppleTalk protocol used by the Macintosh systems, PAP is the protocol used for communication between the Macintosh host computers and printers. PAP sets up, maintains and terminates the connection between the host computer nodes and the network printer and also transfers the data from the host computers to the printers. PAP allows two-way communication from the network printer to the Macintosh host computer to the extent that the status of the network printer is sent to the Macintosh host computer through PostScript. However, most page description language interpreters (PDL) only allow one job to be processed at one time which prevents asynchronous interaction between multiple clients and the network printer.

Figure 1:
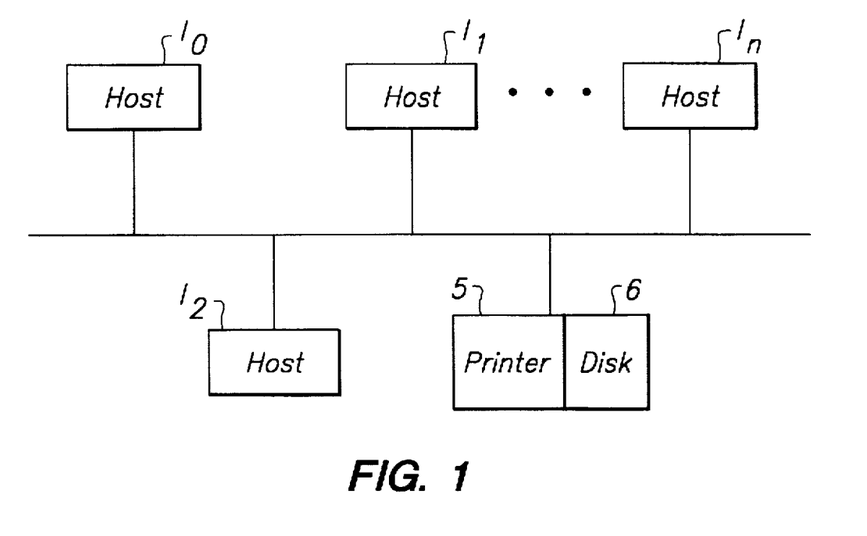
FIG. 1 illustrates a network using a conventional printing system.

Typically, networks utilize shared resource printers. FIG. 1 illustrates the use of a conventional shared resource printer in a network. A plurality of host computers $1_0, 1_1, \ldots 1_n$ and a printer 5 are connected in a network. The printer 5 includes a disk 6 connected internally or externally to the printer 5 for storing the print jobs sent from the host computers $1_0 \ldots n$ before being printed by the printer 5. In shared resource printers, the host computer that first sends a print job to the network printer will have its job printed. Other host computers attempting to have a print job printed by the network printer while another job is being printed will not be able to access the network printer. Therefore, these host computers will repeatedly try to access the network printer during a timing scheme until the network printer becomes available. As a result, the speed of the network will be reduced by the network traffic due to the continuous polling of the host computers to the network printer during the time that the network printer is unavailable. This polling process is undesirable since a host computer will gain access to the printer, with only limited and possibly inexact arbitration after the print job is completed if a number of host computers are attempting to gain access while the printer is busy.

Traditionally, print servers provided access to the network printers and ran the programs necessary to create and operate a print queue for jobs sent to the printers from the host computers. The print queue is a directory that stores into the disk 6 the print jobs waiting to be printed. The print jobs are then printed from the print queue in an FIFO sequence. The print servers require storing the job request and entire job data by spooling this data to the disk 6. Depending on the job size, millions of bytes of data may be spooled to the disk and therefore a large sized disk is necessary.

Even if a large sized disk is used, the disk capacity for storing print jobs may be exceeded when a number of host computers send print jobs to the printer at approximately the same time. When the capacity of the disk is reached, a back up procedure will be implemented where the printer will be polled every two seconds until space in the disk becomes available in a similar manner as in the shared resource printer.

Print servers and a printer may be combined in the same machine on many networks for economical reasons. The main advantage for combining the printer and print servers is that files do not need to be sent from the host computer to the print server machine and then from there to the printer in such a configuration. However, the disadvantage of combining the file and print servers is that the required control for the print queue and the printing activity takes away CPU time from other network activity. In either case, a disk is required to store the data for the entire print job and since the print job is sent from the host computer, spooled to a disk and then transmitted to the network printer when the printer becomes available, unnecessary network activity results.

Accordingly, it is desired to provide for a network printing system which enhances the two-way communication between the host computers and the network printer for a plurality of heterogeneous network protocols. Further along these lines, it is desirable to provide a uniform interface for a wide range of network services, both IDP and non-IDP services, that may be extended and integrated as new protocol/ports are developed.

SUMMARY OF THE INVENTION

These and other objectives are achieved in accordance with the present invention by a network printing system which provides a high level two-way communication between a plurality of network protocols that are desired to operate on the network. In an exemplary embodiment of the invention, the printing system provides an imaging device protocol (IDP) and an IDP emulator which enable a wide variety of network protocols, both IDP and non-IDP ports, to uniformly interface with the printer. A uniform interface to the plurality of network protocols, which are both IDP and non-IDP services, is achieved by this printing system and new protocol/ports may be easily extended and integrated.

As a further feature of the invention, the printing system achieves a "seamless plug and play" connectivity for the variety of protocol/ports. Components of the printing system are divided so that each component provides a normalized interface to the components above until the top component of abstraction is reached in which all network protocols interact in the same way.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Figure 2:
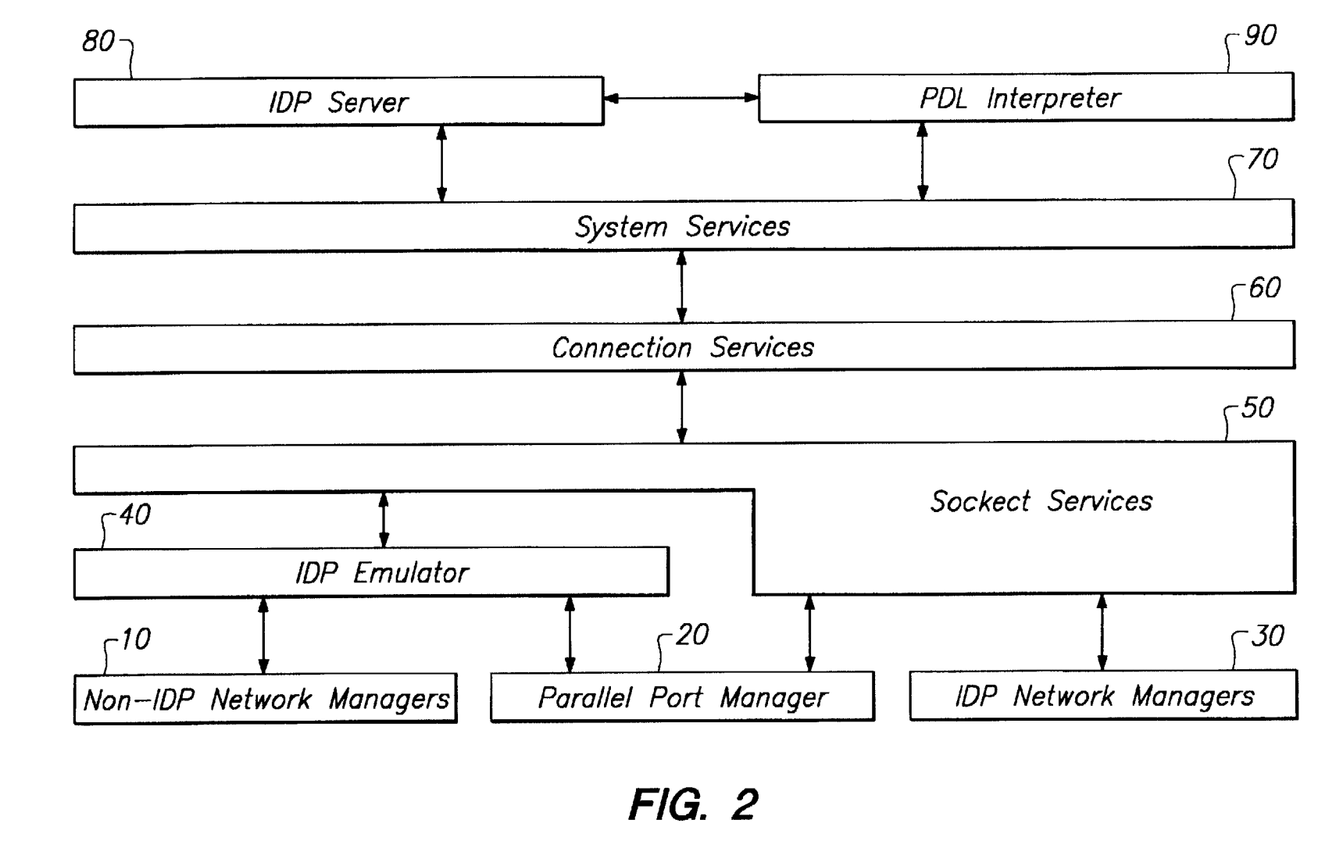
FIG. 2 illustrates the layers of the network architecture for an embodiment of the present invention.

FIG. 2 provides an illustrative embodiment for the layers of the architecture of the network printing system in an embodiment of the present invention. Each of these layers provides a normalized interface with the lower layers and their relationship will be described from the lower layers, which interact with the clients, to the upper layers where all of the protocols/ports interact with the printer in essentially the same way. The interfacing of these layers may be implemented in one or more static memory devices, such as a ROM, which is installed within the network printer.

In order to achieve the normalized interface between the network layers, an imaging device protocol (IDP) is used. IDP provides an application layer network protocol that enhances the two way communication between a host computer and a network printer. IDP operates independently of the network layers below it and only requires that the transport protocol/port be bidirectional. A wide variety of heterogenous network protocols may be supported by IDP which places all of the incoming print job information in the print queue regardless of the protocol. Print job information from both IDP and non-IDP protocol/ports may be placed in the print queue by emulating IDP on the non-IDP protocol/ ports. By emulating IDP on the non-protocol/ports, every client will look like a IDP client to the printer and clients of non-IDP protocols will therefore be completely backward compatible. Although non-IDP clients will not be able to use all of the enhanced features provided by IDP, a sufficient amount of information will provided from the non-IDP protocol/ports so that all of the jobs in the print queue will be able to be fairly arbitrated. For example, complete job name information will not be provided to the print queue for non-IDP clients and only the information that a print job has been sent from a particular port will be entered in print queue. Thereby, a printing system is achieved for interfacing a plurality of heterogeneous network protocols with the network printer.

At the lower layer of the architecture as illustrated in FIG. 2, are non-imaging device protocol (IDP) network managers 10. The non-IDP network managers 10 control network ports that communicate with protocols other than IDP. Examples of some non-IDP protocols are: PAP/LT, PAP/ET, TCP/IP port 9100, LPR/TCP/IP, Novell remote printer or print server modes and bidirectional or unidirectional Centronics. The non-IDP network managers 10 support these protocols to be backward compatible with existing communication protocols. The non-IDP clients cannot access all of the enhanced IDP features in the upper layers, which will be described in more detail, but these non-IDP clients will be able to enter the print queue for processing and will be fairly arbitrated with other print jobs from IDP clients.

IDP network managers 30 provide an interface for IDP protocol/ports. Some examples of protocol/ports that are presently configured for IDP mode communication include ADSP/ET, ADSP/LT, SPX (Novell), TCP/IP and bidirectional Centronics. These protocol/ports are able to communicate with all of the IDP features which enhance the two-way communication between the host computers and the network printer. However, many other existing protocol/ ports may be modified to support IDP and new protocols/ ports may be created to support IDP. The interface of the IDP network managers with these IDP protocol/ports is preferably accomplished with a modified version of the Berkeley socket interface.

The socket services layer 50 is the interface component to all socket interface I/O managers. Sockets are general purpose interprocess communication mechanisms which are logical entities through which programs or processes communicate with the network. Sockets are typically supported in libraries by UNIX implementations for operating systems such as DOS or OS/2 and for network operating systems such as Novell's netware and AppleTalk. A socket interface is a set of functions associated with a particular network node and when a client interfaces with the socket, information and network services may be requested and received.

The Berkeley socket interface is a socket standard implemented in Berkeley Software Distribution (BSD) UNIX 4.3. (*Interworking With TCP/IP*, Vol. 3, Comer et al., Prentice Hall, 1993, pp. 49–55). The conventional Berkeley socket interface has the following major calls: a socket call for creating a socket; a bind call for binding a socket to an end point of a known protocol/port; a listen call for placing a socket bound to a known port in a passive mode; an accept call for accepting incoming connections from a passive socket; a connect call for opening active connections to remote endpoints; a read call for reading data from existing connections; a write call for writing data to existing connections; and a close call for closing existing connections. In an embodiment of the present invention the Berkeley socket interface has simplified the major calls to a passive open call for combining the functionality of the conventional socket, bind, and listen commands and an active open call for combining the functionality of the conventional socket and connect calls. The conventional accept, read, write and close calls have simply been renamed for the modified version of the Berkeley socket interface in the present embodiment.

The parallel port manager 20 provides both a non-IDP UNIX I/O interface and an IDP capable socket interface. The parallel port manager 20 is designed to support a host computer port which alternates between using IDP and non-IDP drivers/utilities to interact with the network printer. An example of such a port is a bi-directional Centronics port. IDP mode communication over Centronics ports should take place using a session/transport/network layer protocol. One example of such a session/transport/network layer protocol is a socket simulation protocol (SSP) for allowing the Centronics port to be used in the same way as other network ports. The parallel port manager 20 is able to automatically sense the transitions between SSP and non-SSP data over Centronics ports.

An IDP emulator 40 enables connections over non-IDP ports so that the upper layers may uniformly interface with both IDP and non-IDP clients. The IDP emulator 40 monitors connection requests on all non-IDP protocol/ports from the non-IDP network managers 10 and the parallel port manager 20 and emulates IDP requests as the connection requests are received. When a connection request is received from a non-IDP client, the IDP emulator 40 builds an IDP print job request message. The IDP emulator 40 ensures that print jobs from non-IDP protocols/ports are arbitrated fairly. The IDP emulator 40 allows non-IDP print jobs to be queued with IDP print jobs so that all of the print jobs may be processed in the order from which the connection attempts are received.

The connection services layer 60 includes a client server connection protocol (CSCP) library. CSCP is a symmetric protocol that facilitates connection between servers and clients over connection-based stream-oriented protocols such as ADSP, TCP and SPX. CSCP resides in the presentation layer of the OSI seven-layer model for interfacing with one or more session level protocols. CSCP facilitates client and server connections by allowing clients of CSCP stacks to request passive or active connections for specific services on a specific node and specifies the service using an alpha-numeric string. Server applications, such as IDP, will minimally open a passive connection through the CSCP stack which specifies the service provided with a service specifier string. Clients of the server open an active connection through CSCP by specifying an identical service specifier string. CSCP implementations on the client and server nodes then negotiate the ports or sockets over which the client/server connection will take place, establish the connection, and return to their clients. Once the client/server connection is achieved, CSCP functions are completed.

Furthermore, CSCP facilitates reconnection to previously connected hosts. IDP uses the reconnection mechanism to implement remote queuing features, to subsequently request job data and to send asynchronous status updates to clients which support IDP. More particularly, IDP only stores the job data request at the printer when the printer is busy printing another job and the actual job data will remain locally at the host computer. Thereafter, the network printer will call back the host computer which corresponds to the first job data request queued in the print queue after the current print job is completed.

The system services layer 70 provides a uniform interface to all of the IDP and non-IDP network services. In a preferred embodiment, the system services layer 70 is an interface which is an extension of the UNIX I/O interface.

Examples of the functions performed by the system services layer 70 are: open; close; reconnect; read; write; swrite; and ioctl. Only the swrite function is unique for the present embodiment. The swrite function enables a status description string to be passed to the I/O managers and the I/O managers may use or dispose of the status depending on the requirements of the protocol/port being managed.

The system services layer 70 also provides a buffered I/O layer for grouping read and write data into blocks of data which may be processed more efficiently. For example, buffers may be provided for 4K bytes of data. Thereby, the number of times that data is handed back and forth is reduced by eliminating the repeated processing of individual data and grouping the data in a larger block that may be easily processed.

The system services layer 70 interfaces with an IDP server 80 and a page description language (PDL) interpreter 90. The IDP server 80 is an application layer network protocol for enhancing the two-way communication between a host computer and the network printer. The IDP server 80 is independent of the network layers below and only requires that the transport be bidirectional. The IDP server 80 allows access to shared information in the network printer and enables two-way communication between the network clients and the network printer to exist at an enhanced level.

Some of the enhanced two-way communication provided by the IDP server 80 includes reading and modifying system parameters, adding and removing fonts, submitting print jobs and manipulating the print queue. By enabling clients of the printer to make job requests which are entered in the print queue without sending the actual print job data, an enhanced set of services for submitting print jobs, retrieving print data queue and asynchronously notifying clients with job status may be achieved. The PDL interpreter 90 may be provided for supporting PostScript, for example. Additional PDL interpreters may be provided to support other languages as desired. The presentation level data from non-IDP protocols/ports is assumed to be PDL data in the example configuration for the present embodiment. The non-IDP network managers 10 and the parallel port managers 20 may be implemented with a UNIX standard I/O interface in a preferred embodiment. The IDP emulator 40 then handles all of the non-IDP protocols/ports, provides a socket interface and emulates the CSCP/IDP interaction necessary to execute print job requests.

Figure 3:
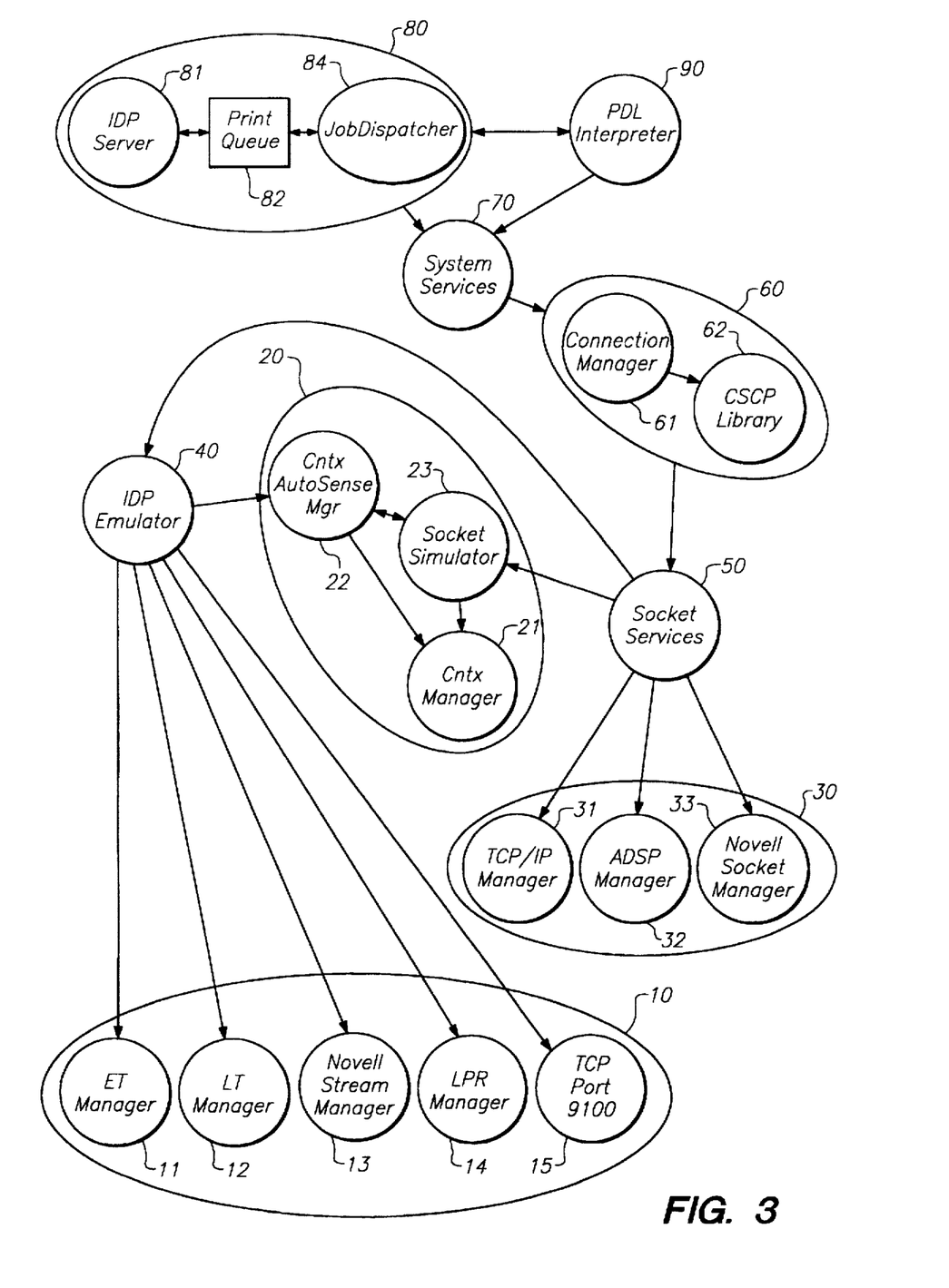
FIG. 3 illustrates a more detailed representation of the network architecture for an embodiment of the present invention.

FIG. 3 illustrates a more detailed example of the network services architecture for an embodiment of the present invention. The non-IDP network managers 10 correspond to a PAP/ET manager 11, a PAP/LT manager 12, a Novell stream manager 13, a LPR manager 14, and a TCP port 9100 manager 15 in this example. The parallel port manager 20 includes a Centronics manager 21 and the IDP network managers 30 include a TCP/IP manager 31, an IDSP manager 32 and a Novell socket manager 33 in this example. The parallel port manager 20 includes a Centronics autosense manager 22 for detecting between non-SSP and SSP data sent over the Centronics ports and a socket emulator 23 handles SSP communication. The IDP emulator 40 directs the non-IDP data to the appropriate non-IDP network manager 10. The connection services layer 60 is shown to include a connection manager 61 and a CSCP library 62 for providing the symmetric protocol that facilitates connection between servers and clients over connection-based stream-oriented protocols.

The system services layer 70 is connected to the connection manager 61. The system services layer 70 provides interaction between the IDP server 80 and the PDL interpreter 90. The IDP server 80 is shown in FIG. 3 to include a print queue 82 and a job dispatcher 84. The PDL interpreter 90 interacts with the IDP server 80 when the job dispatcher 84 dispatches a job from the print queue 82. The information from the print queue 82 proceeds through the layers to connect with a client and obtain the actual print job data that will proceed from the client back up through the layers to the PDL interpreter 90 for printing at the network printer.

Figure 4:
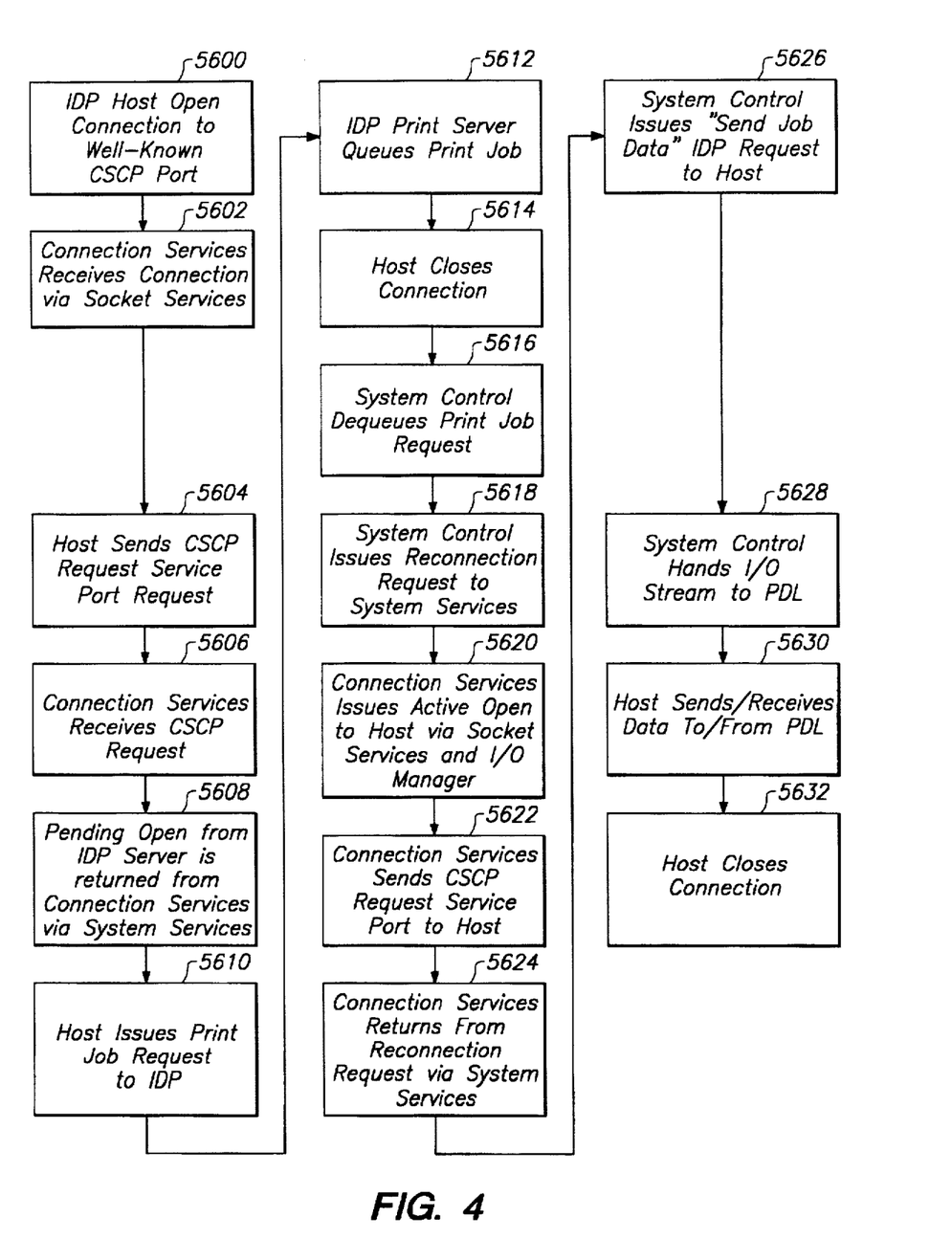
FIG. 4 illustrates a process for connections between IDP client and a printer for an embodiment of the present invention.

FIG. 4 illustrates a process for connections between IDP clients and the printer for an embodiment of the present invention. At step S600, an IDP host and IDP network manager opens a connection to a well known CSCP port. The connection is received by the connection services layer 60 via the socket services 50 at step S602 and the IDP host sends a CSCP request service port request at step S604. The connection services 60 receives the CSCP request at step S606 and a pending open from the IDP server 80 is received from the connection services 60 via the system services layer 70 at step S608. At step S610, the IDP host issues a print job request to the IDP server 80 and the IDP server 80 queues the print job in the print queue 82 at step S612 and the connection is closed at step S614. The system services layer 70 dequeues the print job request at step S616, and issues a reconnection request at step S618. The connection service layer 60 issues an active open to the host via the socket services 50 and the I.O manager 30 at step S620 and the connection services 60 also sends a CSCP request service port request to the IDP host at step S622. At step S624, the connection services 60 returns from a reconnection request via the system services layer 70. The system services layer 70 issues "a send job data" IDP request to the IDP host at step S626 and then the system services layer 70 sends the I/O stream to the PDL interpreter 90 at step S628. The IDP host sends and receives data to and from the PDL interpreter 90 at step S630 and the IDP host closes the connection at S632 when the sending and receiving of data is completed.

Figure 6:
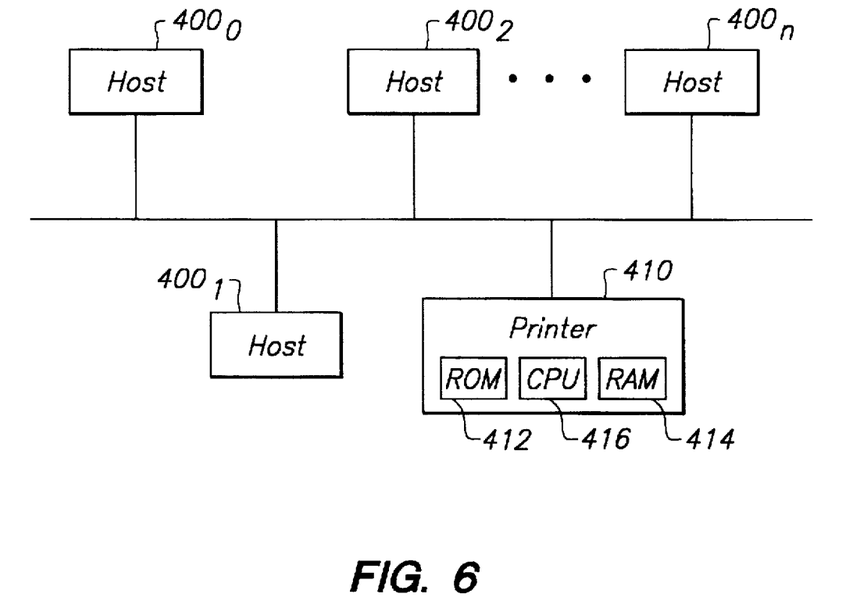
FIG. 6 illustrates the network configuration of a printing system for an embodiment of the present invention.

FIG. 6 illustrates a network configuration of a printing system for an embodiment of the present invention. In FIG. 6, a plurality of host computers $400_0, 400_1, \ldots 400_n$ and a printer 410 are connected in the network. The printer 410 includes a ROM 412, a RAM 414, and a CPU 416. The ROM 412 implements the layers of architecture for interfacing the host computers $400_0 \ldots _n$ with the printer 410 in conjunction with the CPU 416. More than one ROM may be used to implement the layers of the architecture. The RAM 414 is used to implement the print queue 82 in the present embodiment. Because the print queue 82 only stores job information data without storing the actual print data, a small sized RAM 414 is used in contrast to a larger sized spooling disk as is conventionally used.

The print queue 82 is used to queue the job information for all of the print jobs that have an outstanding print request to the printer 410 from any of the host computers $400_0 \ldots _n$ connected to the network. The print queue 82 enables all of the pending jobs from the host computers to be displayed to any of the host computers in addition to displaying only jobs queued from a particular host computer in known print systems. In a print protocol for an embodiment of the present invention, many commands may be used to communicate with the print queue 82 for enhancing the communication between the host computers $400_0 \ldots _n$ and the printer 410. Some examples of the commands for the print protocol in the present embodiment are: print job request; transmit job; enumerate queue; get job information; get job status; cancel job; query print device; sent print device configuration; get accounting log; alert; job status; enumerate job IDs; hold job; remove job; update job information; enumerate print device; lock print device; unlock print device; connect to event; disconnect from event; reconnect to event; check some data; and reset event log commands.

An example of using the print protocol to enhance the communication with the print queue 82 will be discussed for the print job request command for an embodiment of the present invention. Prior to sending a job request from one of the host computers $400_0 \ldots _n$, the requesting host computer sends a print job request to the printer 410 and a job ID is returned from the printer 410 to the requesting host computer. When the printer 410 accepts this print request, the job information for the print job as provided by the requesting host computer is placed in the print queue 82. For this print job request call, the parameters stored in the print queue 82 include job information job name, estimated time to print, document status, number of pages in the document, pages left to print, image content, user comments, media and creator application) and information for notifying the requesting host computer that the actual job data residing at the requesting host computer can be accepted by the printer. When the printer 410 notifies the requesting host computer that the actual job data may be captured, a transmit job command is transmitted from the printer which initiates the sending of the actual job data from the requesting host computer to the printer 410. When a print job is completed for a requesting host computer, this request is removed from the print queue 82 and placed into a job log. The job log may also be implemented in the RAM 414. All of the information associated with the print job request call and stored in the print queue 82 may be accessed and displayed by any of the host computers $400_0 \ldots _n$ connected to the network at any time.

The print queue 82 may also be manipulated by an operator from a local or remote user interface. Examples of queue manipulation commands include interrupt, resume, delete and reorder. In addition, queue manipulation may allow a user to change the job priority and sorting algorithms. For instance, a job sorting algorithm may print all jobs requiring a particular media, such as transparencies first and then, by queue manipulation, the media may be changed and all print jobs needing the newly loaded media may be printed.

In one example of a header format for IDP messages, the structure includes protocol, command, result code, message byte length, and data fields. IDP is a set of related protocols and the protocol suites are intended to map different cooperating servers that add value to a printing environment. A message can be initiated by either a host computer or the network printer. Currently, IDP includes a core protocol, a print protocol, and a font protocol. The core protocol contains commands that are common to all servers and are independent of their type. Printers may support the print protocol and font servers may support the font protocol. Common printers maintain fonts locally and therefore support part of the font protocol as well. As new type of servers are identified, additional protocols can be added to the suite of related protocols for IDP. The protocol field indicates which protocol of the IDP suite that a message is intended for. The command field indicates which command that a message corresponds to. The result code indicates a result of a command and is ignored on request commands. The message byte length field is the number of data bytes in a message. The data field includes message specific data and parameters.

The print job request command comes from a host computer to request the transmission of a job to the printer. When a print job request command is accepted, the information for a print job is placed in the print queue and the job ID is returned by the printer to host computer. The job ID is a unique numerical identifier for the print job and can be used to reference print jobs and acquire further information and status. The print job request command may involve a dialog between the host computer and the printer to negotiate the connection to be used for sending the print job data. The printer can elect to send back a result code on the response to the print job request command thus giving the host computer an opportunity to send the print job data on the same connection they are currently using. If the host computer chooses not to use this communication channel to send the print job data, a normal transmit job command will be used by the printer to solicit the print job data.

As previously discussed, the transmit job command is transmitted from the printer for initiating the requesting host computer to start sending the actual print job data residing at the requesting host computer to the printer. The host computer that will transmit data is determined by the job ID obtained from the print queue 82. More particularly, when the transmit job is transmitted, the job ID associated with the first job queued in the print queue 82 will be obtained and used to direct this command to the host computer associated with the job ID. If the host computer does not recognize the job ID, an invalid print command is returned to the printer. The host computer may also cancel the print job at this time by returning a canceled job request. If the host computer is prepared to transmit the actual job data, then transmission of the actual job from the host computer to the printer may begin.

An enumerate queue command may also be transmitted from any of the host computers $400_0 \ldots _n$ to the printer for obtaining an ordered list of the jobs in the print queue 82 of the printer 410. Information that may be received by the requesting host computer includes the number of elements in the print queue 82, the order that the elements in the print queue 82 are scheduled to be printed, the order that completed print jobs in the print queue 82 were printed, and the estimated time that the print job will complete printing or the time that the print job did actually complete printing. A token parameter may also be provided which is used to determine whether the print queue 82 should be enumerated. This token command saves the time and expense of enumerating the print queue 82 if the client has already done so.

Figure 5:
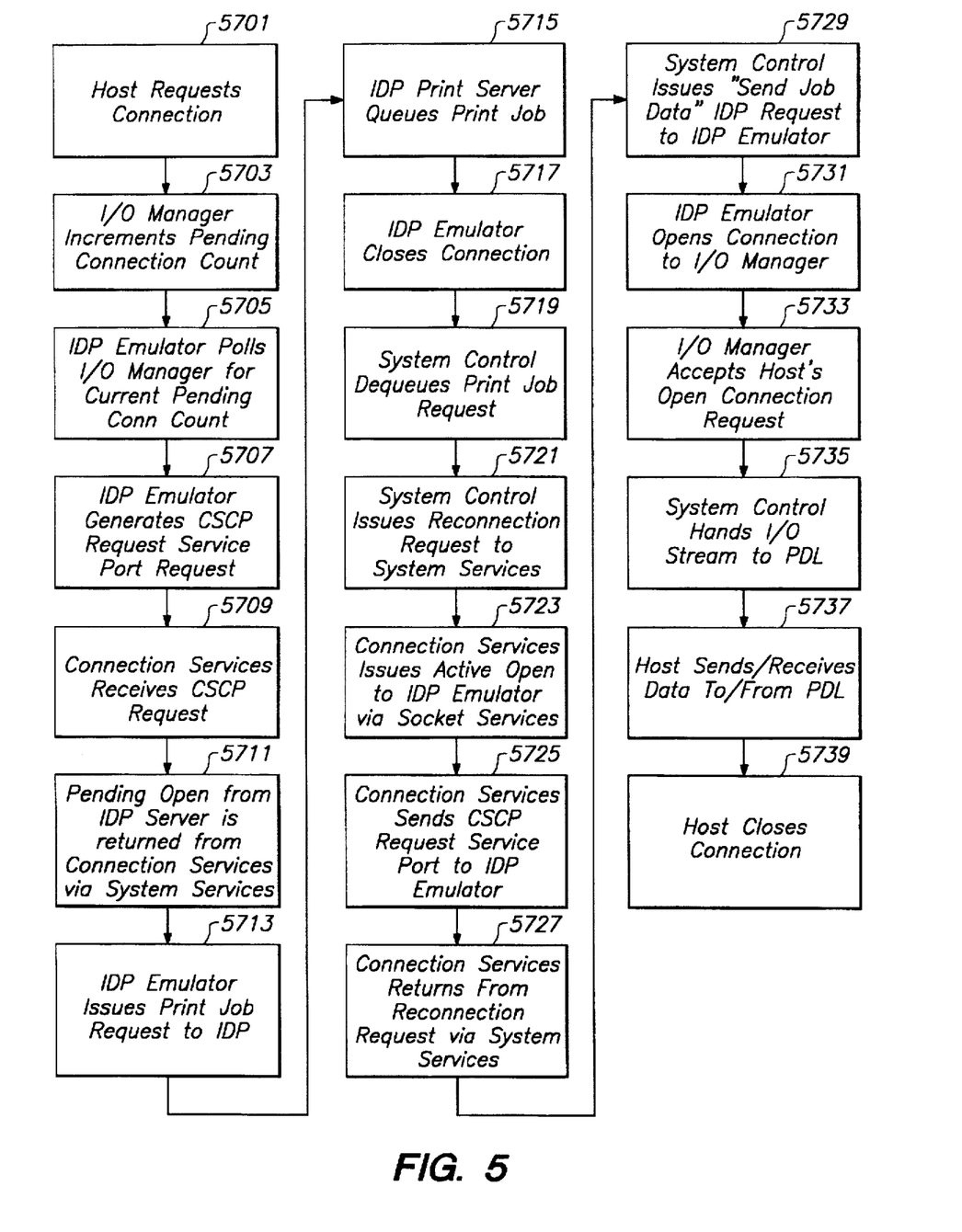
FIG. 5 illustrates a process for connections between non-IDP clients and a printer for an embodiment of the present invention.

FIG. 5 illustrates a process for connections between non-IDP clients and the printer for an embodiment of the present invention. At step S701, a host requests a connection and a host I/O manager increments a pending connection count at step S703. The IDP emulator 40 polls the I/O manager for the current pending connection at step S705 and the IDP emulator generates a CSCP request service port request at step S707. The connection services layer 60 receives a CSCP request at step S709 and a pending open from the IDP server 80 is returned from the connection services layer 60 via the system services layer 70 at step S711. The IDP emulator 40 then issues a print job request to the IDP server 80 at step S713 and the IDP server queues a print job at step S715. The IDP emulator 40 then closes the connection to the IDP server 80 at step S717 before controlling by the system services layer 70 dequeues the print job request at step S719 and then issues a re-connection request at step S721. The connection services layer 60 issues an active open call to the IDP emulator 40 via the socket services 50 at step S723 and sends a CSCP request service port to the IDP emulator 40 at step S725. The connection services layer 60 returns from the reconnection request via the system services 70 at step S727 and then the system services 70 issues a "send job data" IDP request to the IDP emulator 40 at step S729. The IDP emulator 40 opens a connection to the requesting host I/O manager at step S731 and the requesting host I/O manager accepts the open connection request from the host at step S733. Next, the system services layer 70 sends the I/O stream to the PDL interpreter 90 at step S735, and the host sends and receives data to and from the PDL interpreter 90 at step S737. Finally, the connection to the host is closed at step S739 when the sending and receiving of data is completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heterogeneous network printing system comprising:
   a plurality of host computers;
   a plurality of heterogeneous network service protocols/ports for connecting said host computers to the network;
   a printer connected to the network; and
   a heterogeneous interface comprising a uniform imaging device protocol (IDP) and an IDP emulator for uniformly interfacing between said heterogeneous network service protocols/ports and said printer,
   wherein said heterogeneous network service protocols/ports comprise IDP ports and non-IDP ports, and
   wherein said IDP emulator monitors connection requests on the non-IDP ports, provides an IDP print job request message when a connection request is received from a non-IDP port, and queues the resulting IDP print job request message with IDP print job requests received from IDP ports so that print jobs from both IDP and non-IDP ports are processed in an order in which requests are received.

2. A heterogeneous network printing system according to claim 1, wherein said imaging device protocol enables said host computers and said printer to perform high-level printing tasks including reading and modifying printing system parameters, adding and removing printer fonts, submitting print jobs to a print queue, and manipulating a print queue.

3. A heterogeneous network printing system according to claim 2, wherein said imaging device protocol comprises a core command protocol, a print protocol, and a font protocol.

4. A method for providing a uniform interface in a heterogeneous network printing system comprising the steps of:
   (a) connecting a plurality of host computers to a printer in a network by a plurality of heterogeneous network service protocols/ports;
   (b) using a uniform imaging device protocol (IDP) to transfer information between said heterogeneous network service protocols/ports and said printer;
   (c) monitoring connection requests on non-ID ports;
   (d) providing an IDP print job request message when a connection request is received from a non-IDP port,
   (e) queuing IDP print job request messages resulting from said step (d) with IDP print job requests received from IDP ports; and
   (f) processing print jobs from both IDP and non-IDP ports in an order in which requests are received from said IDP and non-IDP ports.

5. A method according to claim 4, comprising the additional step of:

using the imaging device protocol to perform high-level printing tasks, including reading and modifying printing system parameters, adding and removing printer fonts, submitting print jobs to a print queue, and manipulating a print queue.

6. A method according to claim 5, wherein said imaging device protocol comprises a core command protocol, a print protocol, and a font protocol.

7. A peripheral device for use in a computer network, comprising:

a heterogeneous interface utilizing an application-layer imaging device protocol (IDP) to uniformly interface with a plurality of heterogeneous network service protocols/ports which are used in the network, wherein said heterogeneous network service protocols/ports include IDP ports and non-IDP ports; and an IDP emulator enabling communication, in accordance with the uniform interface protocol, between the peripheral device and components in the network which are coupled to said peripheral device via non-IDP ports, wherein said IDP emulator monitors connection requests on non-IDP ports, provides an IDP job request message when a connection request is received from a non-IDP port, and queues the resulting IDP job request message with IDP job requests received from IDP ports so that jobs from both IDP and non-IDP ports are processed in an order in which requests are received.

8. The peripheral device of claim 7, wherein said peripheral device functions as a printer and wherein the imaging device protocol enables a device connected to the printer to perform high-level printing functions including reading and modifying printing system parameters, adding and removing printer fonts, submitting print jobs to a print queue, and manipulating a print queue.

9. The peripheral device of claim 7, wherein said application-layer imaging device protocol comprises a core command protocol, a print protocol, and a font protocol.

10. A peripheral device according to claim 7, wherein said peripheral device functions as a printer.

* * * * *

UNITED STATES PATENT AND TRADEMARK OFFICE
CERTIFICATE OF CORRECTION

PATENT NO. : 5,787,237
DATED : July 28, 1998
INVENTOR(S) : Paul E. Reilly

It is certified that error appears in the above-identified patent and that said Letters Patent is hereby corrected as shown below:

In the claims:
    Claim 4, column 10, line 59, "non-ID" should read - -non-IDP- -.

Signed and Sealed this

Twenty-second Day of December, 1998

Attest:

BRUCE LEHMAN

*Attesting Officer*    *Commissioner of Patents and Trademarks*